Figure 1:
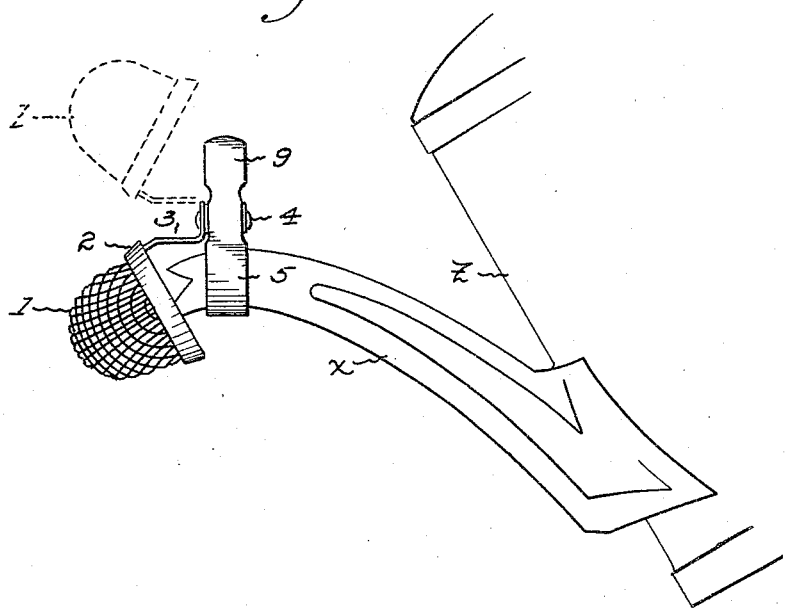

J. H. PITSCHMAN.
TEA STRAINER.
APPLICATION FILED FEB. 25, 1914.

1,199,302.

Patented Sept. 26, 1916.

WITNESSES:

INVENTOR.

UNITED STATES PATENT OFFICE.

JOSEPH H. PITSCHMAN, OF SAN FRANCISCO, CALIFORNIA.

TEA-STRAINER.

1,199,302.  Specification of Letters Patent.  Patented Sept. 26, 1916.

Application filed February 25, 1914. Serial No. 821,014.

*To all whom it may concern:*

Be it known that I, JOSEPH H. PITSCHMAN, a citizen of the United States, residing at and whose post-office address is 2623 Mission street, in the city and county of San Francisco, State of California, have invented new and useful Improvements in Tea-Strainers, of which the following is a specification.

This invention relates more particularly to tea strainers adapted to be applied to the spouts of tea pots.

Among the objects sought to be accomplished are, to provide a strainer easily and quickly applied to the spout of a tea pot; to provide a strainer neat and compact in structure, sanitary in operation, and easily swung into and out of operative position, without removal from the spout of the tea pot.

The invention possesses other advantageous features, that with the foregoing will be set forth at length in the following description, wherein I shall outline in full that form of the invention selected for illustration in the drawings, accompanying and forming part of the present specification. The novelty of the invention will be included in the claim succeeding said description. From this it will be apparent that I do not restrict myself to the disclosures made by said description and drawings, as I may adopt many variations within the scope of my invention as expressed in said claim.

The present invention by reducing the size of the strainer basket, and confining it closely over the end of the spout of the tea pot, by rigid means, in place of hinged bales and other pendant parts, improves the appearance and effectiveness of the strainer.

Figure 2:
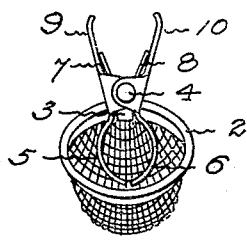

*Drawings.*—In the drawings: Figure 1— is a side elevation of the spout of a tea pot, having a strainer constructed and applied thereto in accordance with this invention. Fig 2—is a rear elevation of the invention looking into the mouth of the strainer basket.

*Construction.*—In detail the construction illustrated in the drawings, to which have been applied like letters of reference, includes the strainer basket 1, composed of wire netting pressed into a hemispherical or conical shape, with the edges crimped into the annular rim 2. The basket 1 is supported by the rigid arm 3, soldered or otherwise attached to the rim 2. This arm is pivoted on the rivet 4, which also forms the pivot of the opposed jaws 5 and 6, forming the clasp for attaching the strainer basket to the spout X, of the tea pot Z. The jaws 5 and 6 of the clasp are held normally closed by the coil spring encircling the pivot, and having its opposite ends 7 and 8, bearing against the handles 9 and 10 of the clasp, to provide the necessary tension to cause the jaws to grip the spout X. The arm 3 being pivoted on the rivet 4, is adapted to be swung into the position indicated in dotted lines in Fig. 1, in which position it leaves the mouth of the spout free.

The strainer is applied to the spout X, by compressing the handles 9 and 10, which opens the jaws 5 and 6, to engage the spout, when the handles are released, leaving the basket 1, in position over the end of the spout, to catch and retain tea leaves or other non-liquid matter discharged through the spout.

Having thus described this invention, what I claim and desire to secure by Letters Patent is;—

A tea strainer having a clasp including a pair of jaws pivoted on a pin; a support swiveled on said pin; and a strainer fixed to said support at an oblique angle to the axis of said pin.

In testimony whereof I have hereunto set my hand this 5th day of February, 1914.

JOSEPH H. PITSCHMAN.

Witnesses:
 BALDWIN VALE,
 J. KRONE-KREUTZ.